United States Patent [19]
Raamot

[11] Patent Number: 4,545,053
[45] Date of Patent: Oct. 1, 1985

[54] TIME SLOT INTERCHANGER

[75] Inventor: Jaan Raamot, Broomfield, Colo.

[73] Assignee: AT&T Information Systems Inc., Holmdel, N.J.

[21] Appl. No.: 591,873

[22] Filed: Mar. 21, 1984

[51] Int. Cl.[4] .......................................... H04Q 11/04
[52] U.S. Cl. ........................................ 370/68; 370/66
[58] Field of Search ...................... 370/68, 66, 67, 63, 370/58

[56] References Cited

U.S. PATENT DOCUMENTS

| | | | |
|---|---|---|---|
| 4,112,258 | 9/1978 | Alles | 370/110.1 |
| 4,413,335 | 11/1983 | Clements et al. | 370/63 |
| 4,455,646 | 6/1984 | Bloodworth | 370/68 |
| 4,485,469 | 11/1984 | Witmore | 370/68 |
| 4,507,780 | 3/1985 | Perry | 370/58 |

Primary Examiner—Douglas W. Olms
Attorney, Agent, or Firm—Donald M. Duft

[57] ABSTRACT

This telephone switching system is comprised of a plurality of time slot interchangers (TSIs) which exchange information on an interleaved basis. The TSI's write and read this information in their associated port data store memories using common buses on a time shared basis. The interleaving permits faster call processing since the data store operates faster than its associated TSI and can therefore respond to read/write requests from a number of TSI's. The interleaving also permits each TSI processor to serve only certain types of calls, wherein each TSI may be equipped with a specialized processor adapted to serve a unique type of call such as conference, nonconference, data, etc.

36 Claims, 14 Drawing Figures

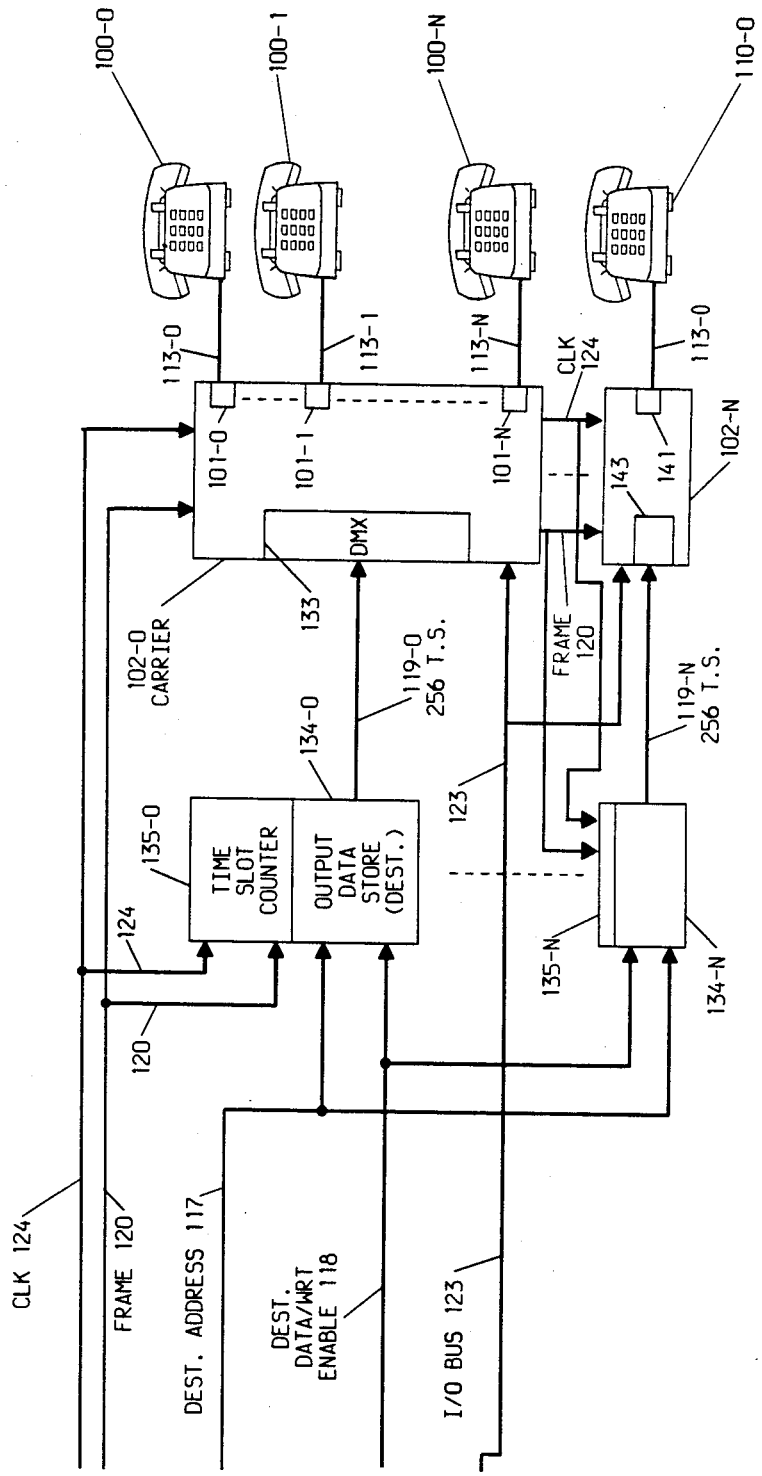

FIG. 7

INSTRUCTION FORMAT

| OP CODE | LOSS | DESTINATION ADDRESS | | SOURCE ADDRESS |
|---|---|---|---|---|
| | | | ACCUMULATOR NUMBER | |
| 4 BITS | 4 BITS | 8 BITS | | 11 BITS |
| | | 11 BITS | | |

FIG. 8

NON CONFERENCE INSTRUCTIONS
(2-PARTY CALL)

1

| OP CODE | LOSS | DESTINATION ADDRESS | SOURCE ADDRESS |
|---|---|---|---|
| SD | 0 | B | A |

2

| OP CODE | LOSS | DESTINATION ADDRESS | SOURCE ADDRESS |
|---|---|---|---|
| SD | 0 | A | B |

SD = SOURCE TO DESTINATION

FIG. 9

INSTRUCTION 0 (BACKGROUND FUNCTION)
INSTRUCTION 1 (AT TIME OF DICONNECT)

| OP CODE | LOSS | DESTINATION ADDRESS | SOURCE ADDRESS |
|---|---|---|---|
| SD | 0 | PORT TIME SLOT | IDLE CODE SOURCE |

FIG. 10

CONFERENCE INSTRUCTIONS
(3-PARTY CALL)

| | OP CODE | LOSS | ACCUMULATOR NUMBER | SOURCE ADDRESS |
|---|---|---|---|---|
| 1 | SA | 0 | 29 | A |

| | OP CODE | LOSS | ACCUMULATOR NUMBER | SOURCE ADDRESS |
|---|---|---|---|---|
| 2 | SPA | 0 | 29 | B |

| | OP CODE | LOSS | ACCUMULATOR NUMBER | SOURCE ADDRESS |
|---|---|---|---|---|
| 3 | SPA | 0 | 29 | C |

| | OP CODE | LOSS | ACCUMULATOR NUMBER | SOURCE ADDRESS |
|---|---|---|---|---|
| 4 | MSAD | 0 | 29 | A |

| | OP CODE | LOSS | ACCUMULATOR NUMBER | SOURCE ADDRESS |
|---|---|---|---|---|
| 5 | MSAD | 0 | 29 | B |

| | OP CODE | LOSS | ACCUMULATOR NUMBER | SOURCE ADDRESS |
|---|---|---|---|---|
| 6 | MSAD | 0 | 29 | C |

SA=SOURCE TO ACCUMULATOR
SPA=SOURCE PLUS ACCUMULATOR TO ACCUMULATOR
MSAD=MINUS SOURCE PLUS ACCUMULATOR TO DESTINATION

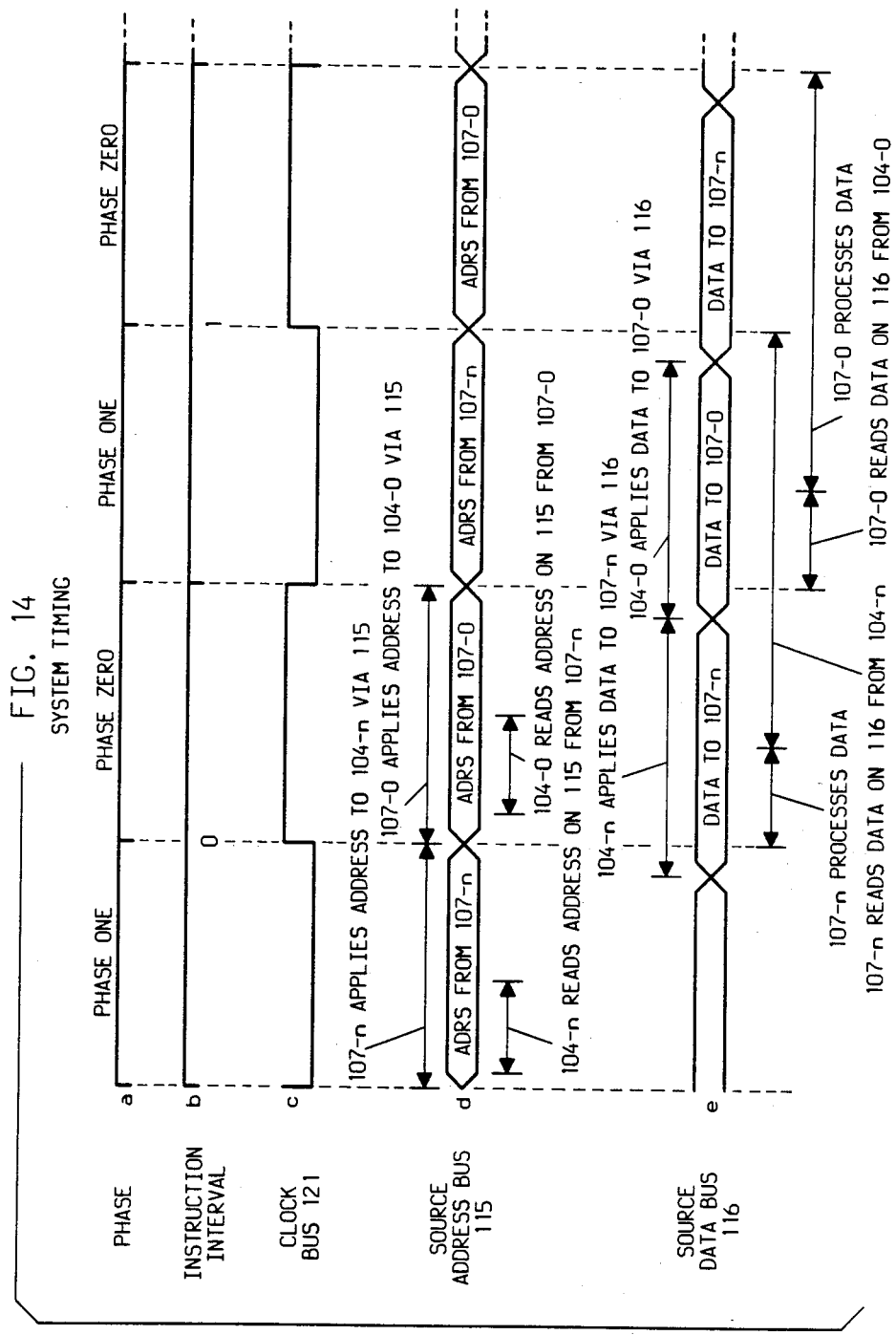

TIME SLOT INTERCHANGER

TECHNICAL FIELD

This invention relates to a time slot interchanger for a time division multiplex switching system.

BACKGROUND OF THE INVENTION

Time Slot Interchange (TSI) facilities are used in time division multiplex switching systems to interconnct a calling station served by a first system time slot to a called station served by a second system time slot. This permits a common signal path to serve concurrently a plurality of calls by time sharing the use of the common path. Each call connection is granted exclusive use of the path for time interval defined by the system time slots associated with the connection.

A basic version of a time slot interchanger comprises a time slot driven RAM which is written with call information during a first system time slot under control of a first source of address information and which is read out during a second system time slot under control of a second source of address information. Each system time slot is associated with a unique RAM location as well as with a unique station served by the system. PCM encoded signals generated at a first station on a call are written into the associated input RAM location during each occurrence of the time slot associated with the first station. The system's time slot counter is used at that time as the addressing signal source for the RAM.

This PCM call information is transferred to a second station involved on the call during each occurrence of the system time slot assigned to the second station. This transfer is effected by applying the output of the system time slot counter to a translation RAM which generates an output signal identifying the time slot serving the first station. This generated time slot number is applied as addressing information to the time slot driven RAM which leads out the call information for the first station from its addressed location and applies the readout information over time shared PCM paths extending to the second station.

U.S. Pat. No. 4,112,258 issued Sept. 5, 1978 to H. G. Alles discloses an improved time slot interchanger that comprises a program controlled signal processor. In addition to performing a conventional time slot interchange function, the Alles TSI can insert a specified gain or loss into the interchange of any call signal. The Alles TSI also provides conferencing facilities. These facilities include the use of a single register operating as an accumulator for generating and storing the conferee sum and difference signals required in the serving of conference calls.

In Alles, all call data are written into an input RAM during each time frame. These data are next transferred to a processor of the TSI for processing. The processed call data are then transferred to an output RAM and are subsequently readout of the output RAM during another time frame. The time required to transfer data from the TSI input RAM via the TSI processor to the TSI output RAM comprises reading time, processing time, and writing time. The number of call connections that can be served as a TSI of the Alles type is limited by the processing time required to convey a signal from the input RAM to the output RAM.

A certain minimum number of PCM samples per second must be transferred between connected stations to maintain the required system frequency response of a PCM system. Since all time slots are served only once each time frame, a minimum sampling rate must be maintained for the number of frames transferred per second from the input RAM to the output RAM. This is called the system frame rate. The TSI input and output RAMs can read and write data at a faster rate than the Alles TSI processor can process the data. The processing time determines the number of call connections that can be served within the system frame time. Without changing the system's frame rate, the Alles TSI RAMs could be read and written at a faster rate if the processing time could be reduced. This would increase the call serving capacity of the system.

SUMMARY OF THE INVENTION

The present invention solves the above and other problems by providing more than one TSI processor in a TSI of the Alles type and by staggering the data transfers between input and output RAMs so that the processing tasks may be shared among the several processors. The several processors use each processing time interval to effect independent data transfers between the RAMs. The processors independently read and write the RAMs over common lines by time sharing the use of the lines.

The call serving capacity of the system is doubled by using two TSI processors. The call serving capacity of a TSI with more than two TSI processors would be increased proportionately. The exchange of call data between input and output TSI RAMs thus becomes more independent of call data processing time by the use of plural TSI's. The switching time through the TSI may approach the time required to transmit the call data between RAMs if enough processors are provided. The call serving capacity of the system is increased by this invention without an increase in either the TSI processing rate or frame rate because the additional number of RAM locations that are read and written during a frame by the additional TSI processors determines the number of calls that can be served concurrently by the system.

The use of several TSI processors also makes it possible to use specialized processors, each of which is adopted to serve certain types of calls. Thus a system equipped to serve both conference and nonconference calls can be equipped with one simple nonconference TSI processor and a more complex conference call TSI processor. Such an arrangement is more economical than the use of general purpose and more expensive TSI processors to serve all types of traffic.

BRIEF DESCRIPTION OF THE DRAWINGS

FIGS. 1 and 2, when arranged as shown in FIG. 3, illustrate a switching system embodying the invention;

FIGS. 7 through 10 illustrate data used by the TSI processor 107;

FIG. 14 illustrates system timing.

DETAILED DESCRIPTION

Figure 1:
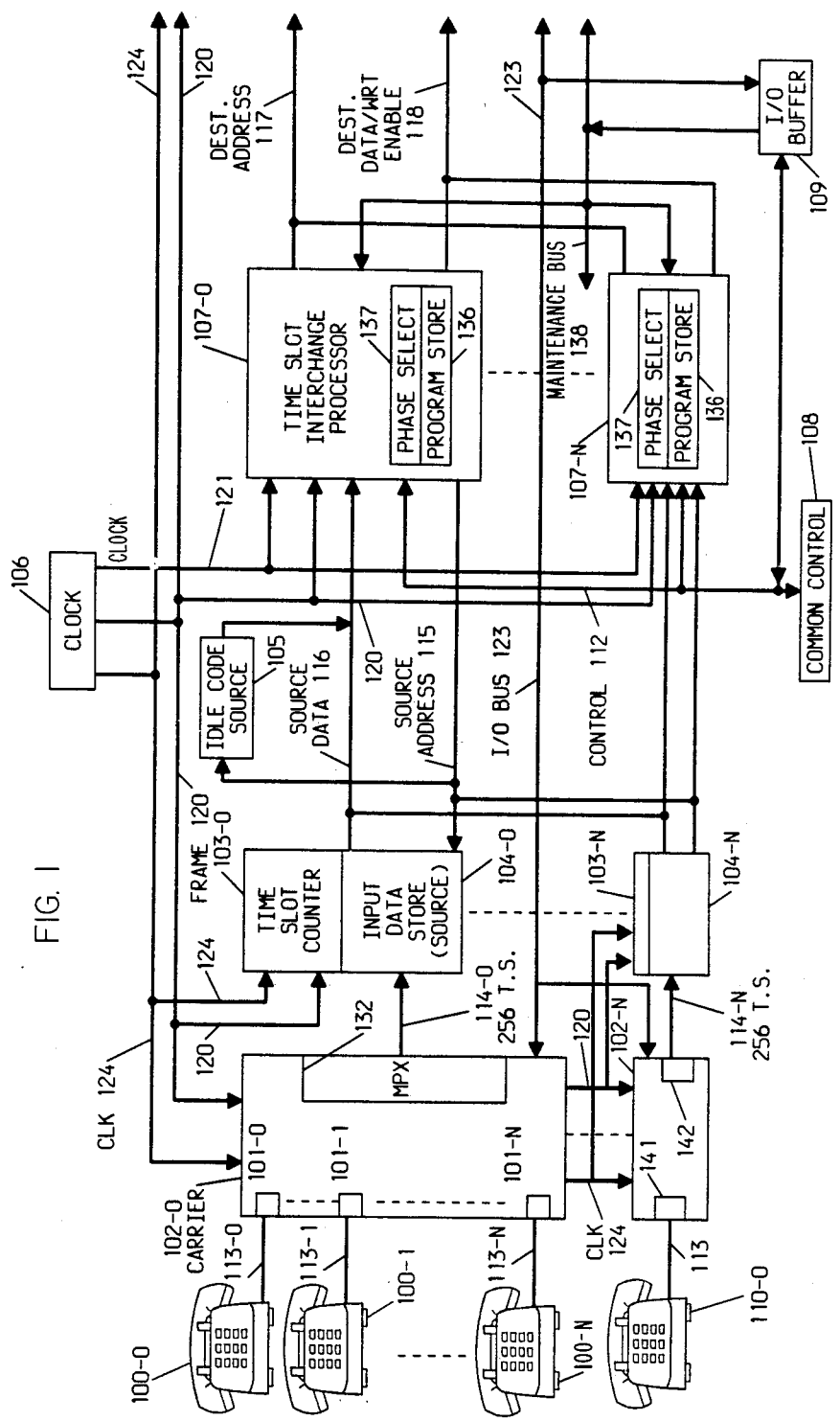

FIGS. 1 and 2, when arranged as shown in FIG. 3, disclose a time division switching system embodying the invention. Elements of FIGS. 1 and 2 are disclosed in what may be termed an "unfolded" configuration in which the flow of call information is from signal generating sources on the left, through the disclosed system elements, to signal receiving elements shown on the right.

The system comprises a plurality of stations 100 and 110, carriers 102, and a plurality of time slot interchangers (TSI). The TSIs include input data stores 104, time slot interchange processors 107, and output data stores 134. The system further includes common control 108 and I/O buffer 109. Each carrier 102 comprises port circuits 101 or 141, each of which is individual to a station 100 or 110 and assigned to a unique system time slot per carrier 102. Each carrier 102 further comprises a multiplexer 132 or 142 on FIG. 1 and a demultiplexer 133 or 143 on FIG. 2.

Multiplexers 132 or 142 receive PCM encoded "speech" or data signals from the port circuits 101 or 141 during each system time slot assigned to a port circuit currently serving a call. Elements 132 and 142 multiplex these received signals together to form a 256 time slot signal. This multiplexed signal is applied over bus 114-0 to input data store 104-0 (for carrier 102-0). Multiplexer 142 operates similarly. Demultiplexer 133 on carrier 102-0 of FIG. 2 receives a multiplexed signal having 256 time slots on bus 119-0 from output data store 134-0. This signal is demultiplexed into separate PCM signals each of which is applied to its associated port circuit 101 during the associated time slot. Demultiplexer 143 operates similarly.

Stations 100-0 through 100-n and 110-0, and carriers 102-0 through 102-n are duplicated on both the right and left sides of FIGS. 1 and 2 in the unfolded mode. A call is served as call signal information generated at a station on the left is extended to the right via its associated port 101 or 141, multiplexer 132 or 142, an input data store 104, through a TSI processor 107, through an output data store 134, through demultiplexer 133 or 143 on FIG. 2, through the port 101 or 141 serving the station to which the call signal is directed, and over the associated path 113 to the receiving station.

The operation of the system is controlled by common control 108 which includes processor and memory facilities. Address, data and control signals are applied over path 112 by common control 108 to TSI processors 107 and I/O buffer 109. The I/O buffer is connected via I/O bus 123 to carriers 102. This bus provides a path by which common control 108 and carriers 102, may exchange I/O information. Common control 108 scans the state of the various system elements and circuits via the I/O buffer 109 and I/O bus 123 to control system operation. It also uses these I/O facilities to effect various system functions and circuit operations such as digit collection.

The I/O buffer 109 is also connected by maintenance bus 138 to the TSI processors 107. As subsequently described, the TSI processors may be of various types for providing appropriate types of call service. Maintenance bus 138 provides a path by which common control 108 may select and control which TSI processor 107 to use for a particular type of call.

Let is be assumed that a connection is to be extended from station 100-0 on the left to station 100-1 on the right. This being the case, the system establishes a connection in which the speech or other intelligence, such as data, representing the subject matter of the call at station 100-0 are transmitted through port circuit 101-0, multiplexer 132, input data store 104-0, a time slot interchange processor 107, output data store 134-0, demultiplexer 133, and port 101-1 to station 100-1. Assume too, that a connection is to be extended by way of a path such as that just described from station 110-0 connected to carrier 102-n on the left, to station 100-n on the right.

The establishment of the connection between stations 100-0 and 100-1 involves the steps of writing PCM signals from calling station 100-0 into an associated location of the input data store 104-0, extending the signal through a time slot interchange processor 107, and writing the processed signal into the location of output data store 134-0 associated with station 100-1. The establishment of the connection for stations 110-0 and 100-n involves the steps of writing encloded PCM signals from the calling station 110-0 into an associated location of input data store 104-n, extending the signal through a time slot interchange processor 107, and writing the extended signal into the location of output data store 134-0 associated with station 100-n.

Assume further that the PCM signals generated by stations 100-0 and 110-0 are assigned to system time slot 0 in each carrier and that both TSI processors 107 shown on FIG. 1 are used to transfer signals between RAMS 104 and 134 during time slot 0.

Multiplexer 132 receives PCM encoded call signals from the station 100-0 via port circuit 101-0 and multiplexes the received signals into time slot 0 of the 256 time slot signal on bus 114-0 extending to input data store 104-0. In the same way, the PCM encoded call signals from station 110-0 and port 141 are multiplexed into time slot 0 on bus 114-n extending to input data store 104-n. Input data store 104-0 has 256 memory locations each of which is unique to and associated with a different one of the time slots on bus 114-0 and, in turn, one of stations 100. Memory locations in data store 104-n are similarly associated with time slots on bus 114-n and their associated stations 110.

Let is be assumed that each memory location within input data store 104-0 has a number corresponding to the numerical suffix of a corresponding one of the stations 100. In this case, the sgnal from station 100-0 is transmitted over bus 114-0 in time slot 0 and written into location 0 of input data store 104-0 under control of address signals from time slot counter 103-0. Assume too that the signal from station 110-0 and port 141 is transmitted over bus 114-n in time slot 0 and written into location 0 of input data store 104-n under control of address signals from time slot counter 103-n.

It is subsequently described how the signals in locations 0 in stores 104-0 and 104-n are transmitted through the TSI processors 107, extended into locations 1 and N of store 134-0 and extended to stations 100-1 and 100-N during time slots 1 and N of carrier 102-0. Stations 100-0 and 110-0 also receive signals from stations 100-1 and 100-N during time slot 0 in carriers 102-0 and 102-N.

DATA INTERCHANGE BETWEEN RAMS 104 and 134

Time slot interchange processors 107 perform a virtual interconnection function by reading call signals in specified locations of an input data store 104, by performing any required operations on these signals, such as a gain or loss insertion, and by then writing a resultant signal into the location of the output data store 134 associated with the station to which the call signal is directed. Each TSI processor 107 includes a memory, termed program store 136, which contains the program instructions required to control the operations of the processor 107. Memory 136 is updated periodically by common control 108 as common control dynamically determines the tasks that are to be performed by each TSI processor in the serving of calls.

The instructions written by common control 108 into program store 136 of each TSI processor 107 specify each virtual interconnection that is to be effected by the TSI. The information in each instruction specifies the address of the input data store 104 from which the call signal is to be read, the address of the output data store 134 into which the signal is to be written, the signal gain or loss insertion, as well as OP code information indicating the call type, such as conference or nonconference. For a nonconference call that involves no gain or loss insertion, the program store instruction merely specifies the address of the input data store from which the signal is to be read and the address of the output data store into which the signal is to be written after passing through the TSI.

Any TSI processor 107 can execute any instruction of its program store 136 upon any one of the 256 time slot signals incoming on bus 114 into the plurality of input data stores 104. To do this, a TSI processor 107 accesses a selected location in a selected data store 104 by applying appropriate "source" address information to bus 115 during the time slot addressing period assigned to it. This is the instruction processing interval. This is subsequently described in detail. Each TSI processor 107 can access any input data store 104. Each processor 107 receives over bus 116 call information, termed source data, read out of an addressed location of an input data store. This incoming source data received by a TSI processor 107 is processed as specified by the instruction in program store 136.

On its output side, a TSI processor 107 applies processed call information over bus 118 to a selected location of a selected output data store 134. Processor 107 effects this operation by applying a "destination" address to bus 117 during its assigned instruction interval and by concurrently applying to bus 118 the call information that is to be written into the addressed output data store 134.

The several TSI processors 107 alternately read the input data stores 104 once during each instruction interval. The timing of the processors 107 in the reading sequence is controlled by phase selectors 137 which are, in turn, controlled by common control 108 via maintenance bus 138. It is assumed herein that TSI processor 107-0 addresses input data store 104-0 during the first portion of an instruction interval and that TSI processor 107-n addresses input data store 104-n during another portion of an instruction interval. Conflict between these addressing operations is avoided by proper timing even though both TSI processors 107 address the input data stores 104 over the same source address bus 115. The time relationships involving these data transfers are shown on FIG. 14.

Two instruction intervals (0 and 1) each having a phase 0 and 1 are shown on lines a and b of FIG. 14. The clock bus 121 signal is shown on line 8. FIG. 14 discloses blocks on line d representing data on source address bus 115 at the leading and trailing edges of the signal from clock bus 121 on line c. The address byte from TSI processor 107-0 is applied to address bus 115 during the leading edge of the signal from clock bus 121. This occurs during phase 0 of each instruction interval. The address byte from TSI processor 107-n is applied to bus 115 during phase 1 of instruction interval 0. Likewise, data bytes are sent by the input data stores 104 to the TSI processors 107 during the phase times that have been assigned to them. This is shown on line e. Each TSI processor processes the received input data and writes in a similar assigned sequence to the output data stores 134, during each instruction interval of the phase that is assigned to it. FIG. 14 is subsequently described in further detail.

Output data store 134-0 is periodically read out by time slot counter 135-0. The data read is formed into a 256 time slot signal on bus 119-0 and applied to demultiplexer 133 of carrier 102-0. Element 133 demultiplexes the received signal and applies the PCM signal from each time slot to its associated port 101 and station 100. The called station data for the present calls are in locations 1 and n of the output data store 134-0; they are transmitted over bus 119-0 in time slots 1 and n; they are applied to demultiplexer 133 where they are demultiplexed; and they are extended to port circuits 101-0 and 101-n for transmission over paths 113-1 and 113-n to stations 100-1 and 100-n.

Idle code source element 105 is an addressable memory that supplies a bit pattern representing 0 volts when addressed over bus 115 by a TSI processor 107. It is used to write the 0 volt pattern into output data store locations associted with idle stations.

DESCRIPTION-FIG. 4

Figure 4:
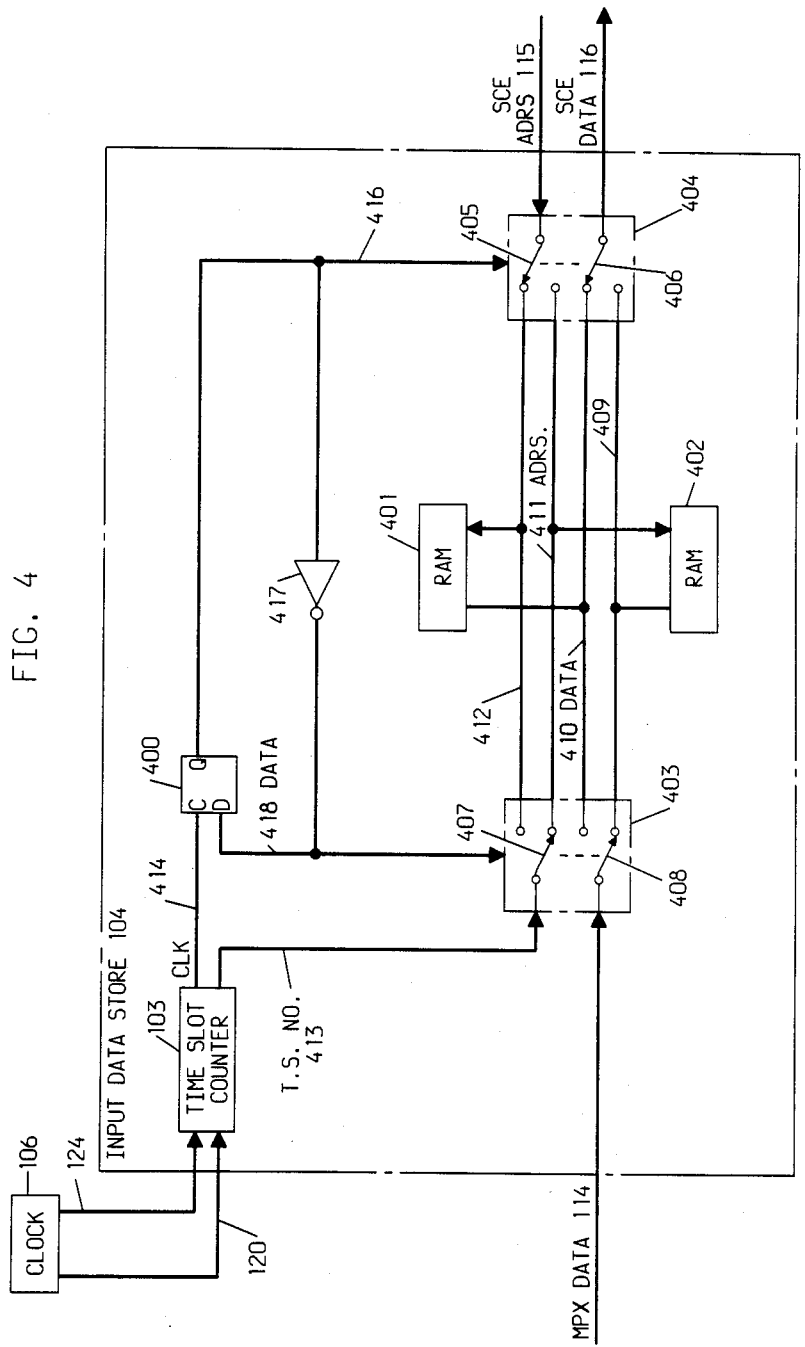
FIG. 4 illustrates an input data store 104.

FIG. 4 discloses further details of an input data store such as store 104-0. The input stores are of the alternating type, as shown in Alles, in that they each comprise two RAMs 401 and 402 which alternate functions on successive system time frames insofar as concerns the reception of data from a carrier 102 and the transmission of data of the TSI processor 107. This alternating function is controlled by electronic switches 403 and 404. The position of these switches remains fixed for the duration of a time frame and the switch position determines the function performed by each RAM for the frame duration.

Clock 106 generates and applies a frame pulse to path 120 and a time slot clock signal to path 124. These signals are applied to time slot counter 103 which applies binary coded times slot signals to path 413 for writing PCM call data received on path 114 into the RAM 401 or 402.

Multiplexed call data from a carrier, such as carrier 102-0, is applied for the duration of a time frame over path 114 to switch 403 of the input data store. Call data received during the immediate preceding frame is extended from the input data store to the TSI processor 107 over path 116 to switch 404. With the "contacts" of switches 403 and 404 positioned as shown on FIG. 4, PCM call data from a carrier on path 114 is extended through contacts 408 to the data input of RAM 402 via path 409. This information is written into the RAM under control of the address information applied to the RAM from time slot counter 103 over path 413, contacts 407, and path 411. Time slot counter 103 applies binary coded time slot signals as addressing information to the RAM 402 at this time so that the call data received on path 114 during each system time slot is written into the RAM 402 location associated with the time slot.

With the "contacts" of switch 404 in the position shown on FIG. 4, the TSI processor 107 applies address and control information over path 115, contacts 405, and path 412 to the address input of RAM 401. RAM 401 reads out the contents of the addressed location and applies the read out information over path 410, contacts 406, and path 116, to the TSI processor 107. By this means, the TSI processor 107 operates under control of its program store 136, reads out PCM data from RAM 401, and performs the specified call processing operations on the data it receives from the input data store.

The "contacts" of switches 403 and 404 are moved to their other position at the end of a frame so that the data received on path 114 during this next frame is read into RAM 401 under control of address signals generated by time slot counter 103 and applied to the address input of the RAM on path 412. Similarly, during this next frame, the TSI processor 107 addresses RAM 402 via path 115 and reads out the call data received by the input data store on the preceding frame.

Each frame pulse on path 414 from time slot counter 103 is applied as a clock signal to flip-flop 400. The Q output of the flip-flop is connected over path 416 to the control input of switch 404 as well as to inverter 417 which, in turn, is connected via path 418 to the control input of switch 403 as well as to the D input of flip-flop 400. Inverter 417 applies a signal to the D input that is the inverse of the signal on the Q output of the flip-flop. By this means, each frame pulse on path 414 clocks the signal on the D input of the flip-flop to the Q output. This causes the polarity of the potentials on paths 416 and 418 to alternate and, in turn, alternate the state of switches 403 and 404. This reverses the functions of RAM 401 and 402 each frame.

From the above, it may be seen that the switches 403 and 404 remain fixed for a frame duration so that one of RAMs 401 and 402 is then written with the PCM information received from an associated carrier on path 114 while the other RAM is read out by the TSI processor 107 with the read out call information being that that was received by the input data store during the immediately preceding frame. Subsequently, at the end of the current frame, a new frame pulse is received on path 414, the contacts of switches 403 and 404 change position, and the functions of the RAMs 401 and 402 alternate. This permits new call information to be made available to the TSI processor from the RAM that was just written into. It also permits the RAM that was just read out by the TSI processor 107 to be available for the writing of new PCM call information.

There are two reasons that necessitate the use of alternating input data stores. First, in order to simplify the programming of the TSI program store 136, it is necessary when two or more program store instructions for a call sequentially access an input data store location during a single time frame that the same call information be returned to the TSI processor for each instruction. This would not be the case if a single data store were used since new call information could be written into the store location at any time. It is necessary that the contents of an input data store location remain unaltered by new incoming data for the duration of a frame since for conference connections, as subsequently described, the same memory location of an input store is used by the TSI processor a plurality of times. It is used a first time to form a sum signal representing the speech of all conferees. It is used a second time to form a difference signal that is transmitted back to each conferee. Because of the storage requirement of this PCM information for the duration of a frame and the fact that the TSI program instructions can occur sequentially over the entirety of a frame duration, the use of alternating data stores simplifies the programming of the program store 136.

The use of alternating stores permits one store to collect new PCM data during a time frame while the TSI executes its read operation on the other store during the same frame. The time ordering of call information into multiple time slots is maintained by this expedient since multiple time slots are switched as a unit when the stores alternate function. The preservation of the time ordered information within a store facilitates the simplicity of the program store programming and eliminates constraints such as a mandatory relationship between the TSI instruction placement and the time slot numbers referenced by the instruction.

DESCRIPTION-FIG. 5

Figure 5:
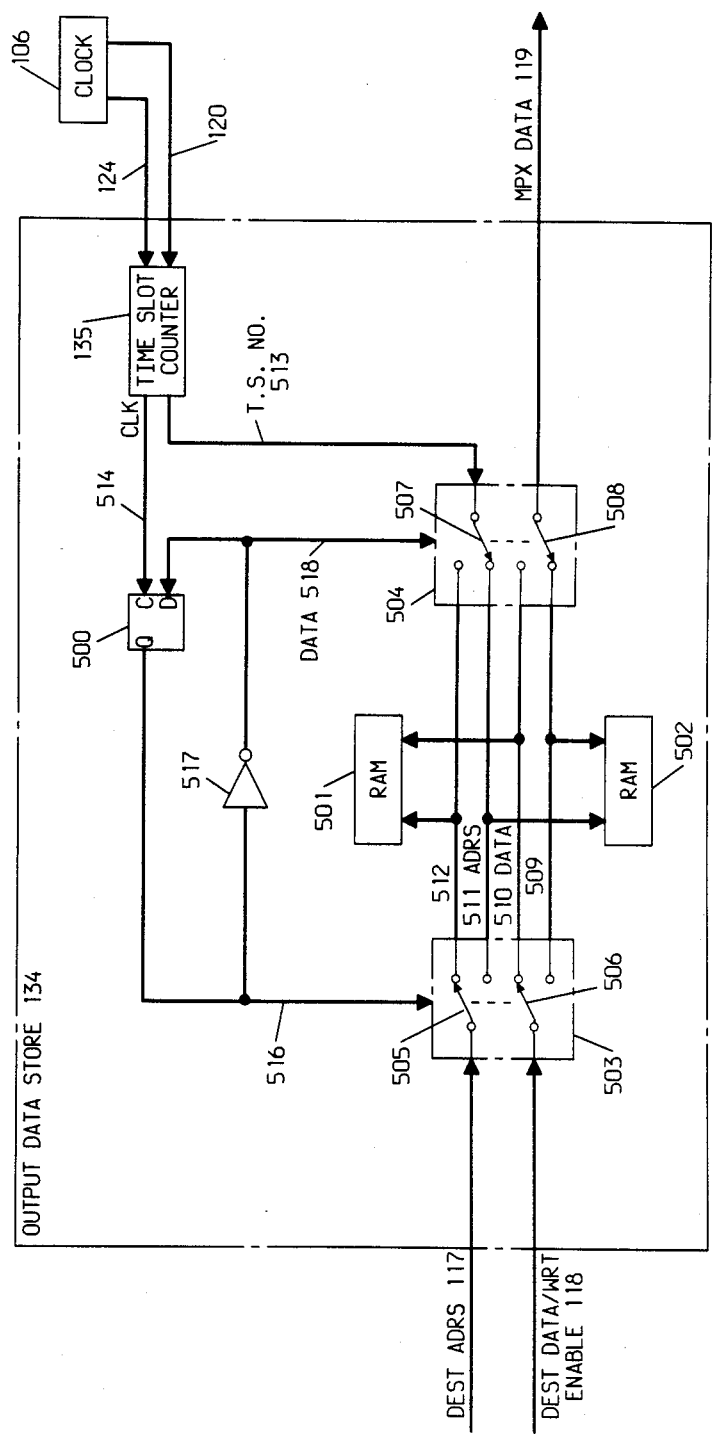
FIG. 5 illustrates an output data store 134.

FIG. 5 discloses further details of an output data store such as store 134-0. The output data stores are structurally comparable to the input data stores of FIG. 4. The output data store comprises RAMs 501 and 502, switches 503 and 504, together with control circuitry comprising inverter 517, flip-flop 500, and time slot counter 135. The control circuitry switches the "contacts" of electronic switches 503 and 504 at the end of each time frame so that the functions of each RAM alternate can remain fixed for the duration of the next frame. In the switch positions shown on FIG. 5, RAM 501 is written with the "destination" information from the TSI processor 107. Destination address information is applied by processor 107 to RAM 501 via path 117, contacts 505, and path 512. The destination data to be written is applied by the processor over path 118, contacts 506, and path 510. During this same frame, RAM 502 receives address information over path 513, contacts 507, path 511 from time slot counter 135 and reads out the contents of its addressed locations. The read out call information is extended over path 509, contacts 508, and path 119, to the demultiplexer 133 of the carrier associated with the output data store.

Upon the occurrence of the next frame, the contacts of switches 503 and 504 change position so that the functions of RAMs 501 and 502 are reversed. At this time, RAM 502 is written with call information from the TSI processor 107 and RAM 501 is read out by the time slot counter 135 with the read out call information being extended over path 119 to the demultiplexer of the carrier associated with the output data store.

Clock 106 generates the signals required to cause counter 135 to generate and apply binary coded time slot signals as addressing information to path 513 as well as a frame signal to path 514. In a manner similar to that described for FIG. 4, the frame signal on path 514 switches the state of flip-flop 500 and, in turn, the polarity of the signals applied to paths 516 and 518. This causes the positions of the contacts of switches 503 and 504 to move to their alternate position.

Time slot counter 135 is advanced with respect to the time slot circuitry of its associated carrier 102. This is done in order to compensate for the time delay involved in transmitting call information from the output data store to the carrier, demultiplexing it within the carrier, and gating it to the correct port circuit during the occurrence of the system time slot assigned to the port circuit.

If the time slot counter of the output data store operated in coincident synchronism with that of the carrier, the information read out of the output data store and applied to the demultiplexer at the receiving carrier would not arrive at the receiving port circuit during the occurrence of the system time slot assigned to the port circuit. This being the case, the received information would be lost or applied to the wrong port circuit. For the same reasons, the counter 103 of the input data store is somewhat delayed with respect to the timing circuitry of its carrier 102.

SEQUENCE OF TSI PROCESSOR OPERATION

The sequence used to make it possible for more than one TSI processor 107 to address any of several input data stores 104 is described in further detail. Timing is such that the several TSI processors 107 alternately read input data stores 104 during each instruction interval. One processor addresses an input data store 104 on address bus 115 while another processor reads data on bus 116 from the address priorly sent over bus 115.

The sequence of operation for two TSI processors 107-0 and 107-n, is shown on FIG. 14. The described action takes place during instruction intervals 0 and 1. Similar action takes place for other instruction intervals. An addressing time is assigned to each TSI processor 107 during each instruction interval. These addressing times are designated phase intervals 0 and 1 per instruction interval. TSI processor 107-n is assigned to phase 1 of each instruction interval and TSI processor 107-0 is assigned to phase 0. Hexagrams on FIG. 14 indicate periods of stable data by means of horizontal lines, and periods of unstable data by means of crossed diagonal lines. One set of these data (line d) comprise location addresses sent by TSI processors 107 to input data stores 104 over source address bus 115. Another set is the data returned from the store locations thus addressed to TSI processors 107 over source data bus 116 as shown on line e. The process of addressing locations in data stores 104 and reading data returned from addressed data stores 104 locations are triggered by the transitions of the clock bus 121 signal.

It is shown on the left of FIG. 14 on line d that TSI processor 107-n applies the address of an input data store 104-n location to source address bus 115 coincident with the low going edge of clock bus 121 signal for phase 1 of instruction interval 0. The addressed location is read out by the data store 104-n after the address on bus 115 becomes stable. The data at the addressed location are applied to source data line 116 by input data store 104-n. This is shown on line e for phase 0 of instruction interval 0. Recall that these data were written into the specified location in response to their time slot position as they appeared on bus 114-0 from multiplexer 132. Since each time slot position is associated with a particular station 100 and with a particular location in input data store 104-n, the data now on source data line 116 is associated with station 100-0. TSI processor 107-n now reads the data on source data line 116 in response to a high going leading edge of the signal on clock bus 121 during instruction interval 0. TSI processor 107-n then processes the data and sends it to an output data store 134. The entire period between the successive reading of source data bus 116 by processor 107-n is available for the processing of the read data by TSI processor 107-n.

While TSI processor 107-n is reading source data on bus 116 during phase 0, TSI processor 107-0 begins to send the address of a data store 104-0 location over source address bus 115. The address remains on the bus for the entire period that the signal on clock bus 121 is high. This occurs during phase 0 of instruction interval 0. The address is read after the address data become stable by the addressed input data store 104. The addressed store location is then read out. Input data store 104-0 applies the readout data to source data bus 116. TSI processor 107-0 reads the data on source data bus 116 in response to the low going edge of the clock bus 121 signal beginning at phase 1 of instruction interval 1. TSI processor 107-0 then processes the data so it may be sent to its destination, an output data store 134.

The sequence continues as described above. One TSI procesor 107 applies an address to source address bus 115 during a phase of FIG. 14 while, during the same phase, a second TSI processor 107 reads priorly addressed data from source data bus 116 and processes the data. One TSI processor 107 applies an address to destination address bus 117 during a phase of FIG. 14 while, during the same phase, a second TSI processor 107 writes priorly addressed data from destination data bus 118.

DESCRIPTION OF PHASE SELECTOR 137

The data transfer sequence above-described is assigned by software in common control 108 which, in turn, controls the phase select circuit 137 of each TSI processor 107. The phase select circuit is shown in detail on FIG. 13 and comprises latches 1301 and 1302 as well as gates 1303, 1306 and 1307. Each TSI processor has a circuit per FIG. 13.

Figure 13:
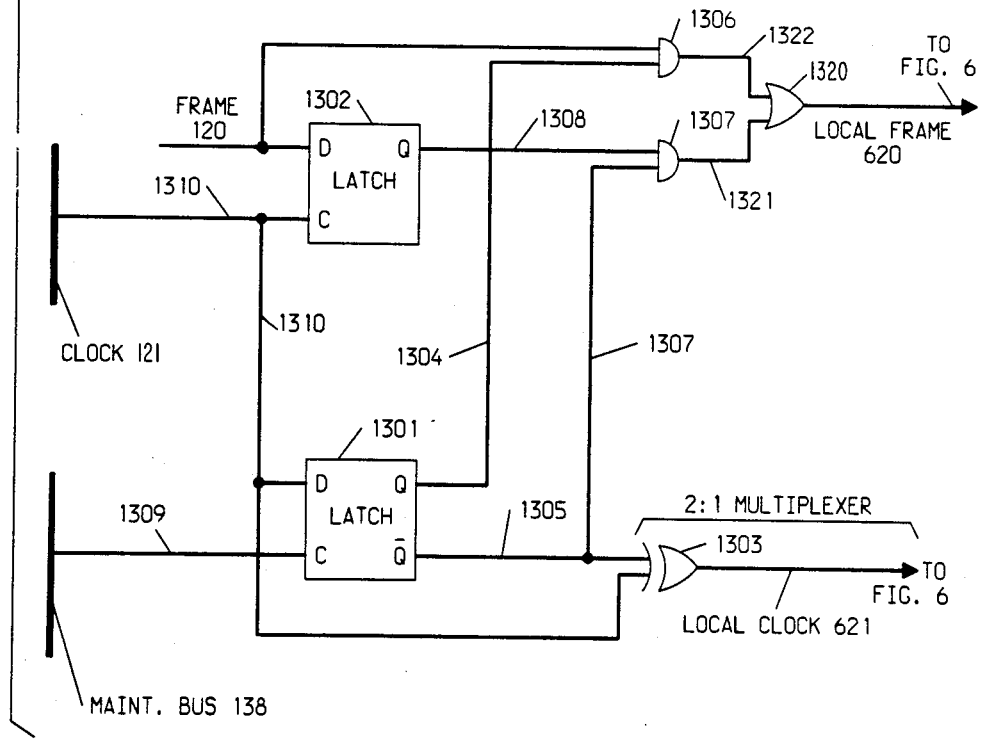
FIG. 13 illustates a phase select element 137.

The circuit of FIG. 13 functions by causing the TSI processor 107 of which it is a part to perform specific operations at specific times. Namely, it causes its processor to perform specific acts during the phase interval assigned to its TSI processor during each instruction interval. Let it be assumed that the circuit of FIG. 13 is a part of TSI processor 107-0 and that this processor is assigned to phase 0 of each instruction interval. The following describes how lead 621, termed local clock, is made high on FIG. 13 during each occurrence of the instruction interval phase assigned to the TSI processor of which it is a part.

The potential on lead 621 is controlled by latch 1301 and gate 1303. The D input of latch 1301 receives the clock signal on bus 121 and path 1310 which, as shown on FIG. 14, is high during each occurrence of phase 0. Common control 108 applies signals over maintenance bus 138 and path 1309 to assign a TSI processor to a particular phase. The circuit of FIG. 13 is assumed to be a part of TSI 107-0 and assigned to phase 0. This being the case, maintenance bus 138 drives path 1309 high during a first occurrence of phase interval 0. This high is applied to the C input of latch 1301. The concurrent appearance of the high on both the D input and the C input sets latch 1301 and drives its Q output high and its not-Q output low. The latch remains in this state until another pulse is applied over path 1309 to assign the circuit of FIG. 13 and its TSI processor to a different phase.

All subsequent clock pulses on lead 121 and lead 1310 are applied to the upper input of exclusive OR gate 1303 which acts as a two-to-one multiplexer. This high on its upper input is not inverted since its lower input is currently low. Therefore the high on clock bus 121 and path 1310 extends through gate 1303 and appears as a high on the local clock lead 621 during each occurrence of phase 0 to which the circuit of FIG. 13 and its TSI processor is assigned.

Thus, lead 621 goes high each time the clock bus 121 shown on FIG. 14 goes high. This is the case since the phase of which the circuit of FIG. 13 is a part is assigned to phase 0. The other circuit FIG. 13 and its TSI processor, for a two TSI processor system, would be assigned to phase 1 and would work in the opposite manner. Namely, the clock bus 121 signal on terminal D of its latch 1301 would be low when the high appears on input C of its latch 1301 to assign the circuit to a phase. Therefore the latch 1301 would not be set. This would assign it, together with its TSI processor, to phase interval 1. In this case, the not-Q output of the latch on lead 1305 would remain high which would cause the exclusive-OR gate 1303 to invert the low clock 121 signal applied to lead 1310 so that the latch output lead 621 would be high during each occurrence of phase 1 rather than phase 0.

The above describes the operation of the latch 1301 for a two TSI system. The latch would work in a similar manner for a system having more TSIs, such as for example four TSIs. In this case, gates and the like would be provided to cause the latch 1301 output lead 621 of each circuit of FIG. 13 to be high only during the occurrence of the phase assigned to its TSI processor. Also, each instruction interval would be divided into, for example, four phases for a four TSI processor system and the lead 621 of each FIG. 13 associated with each TSI processor would be high only during the occurrence of its assigned phase interval. Also, for a four TSI processor system, two clock signals of the lead 1310 type are needed together with two latches 1301 to form a four-to-one multiplexer.

FIG. 1 shows the clock 106 producing a first clock pulse on path 121, a second clock pulse on path 124 and a frame pulse on path 120. The clock pulse on paths 124 and 121 coincide and reoccur with each instruction interval occurrence. A frame pulse is applied to path 120 to specify the beginning of each frame of time slots. The frame signal 120 is high during the occurrence of the last instruction interval of each frame to specify the beginning of the next frame. The reception of the clock pulses on path 121 of FIG. 1 has already been described. Path 120 applies a high potential to the TSI processors to specify the beginning of each frame. The circuitry associated with each circuit of FIG. 13, gates 1306 and 1307 and latch 1302, cause the timing of the two TSI processors to be offset from each other by one phase interval or one-half of an instruction interval for a two TSI processor system.

A local frame signal is generated and applied to path 620 as follows. The signal on system frame line 120 is high during the last time slot of a frame and is low during the other 255 time slots. This same signal also initializes the TSI program counter 601. The TSI processor 107 assigned to phase 0 has its processes offset from the beginning of an instruction interval by half the period of a time slot so as that the two processors 107 can operate in sequence as described. Their frame signals must also be offset because the program counter 601, as subsequently described, of FIG. 6 of each processor 107 must be reset in synchronism with the other TSI functions timed by the signal on local clock line 621.

Latch 1302 offsets the occurrence of the system frame signal 120. Signals at the various terminals of latch 1302 are shown next to the latch 1302 on FIG. 13. Note that a leading edge of the clock bus 121 signal at the C terminal of latch 1302 occurs in the center of the high part of the frame signal on line 120 and terminal D. The high level on frame line 120 is extended through latch 1302 on this leading edge to produce the leading edge of the signal at the Q terminal of latch 1302. The next leading edge of the signal at the C terminal of latch 1302 occurs when the signal at the D terminal of latch 1302 is low. This extends the low through latch 1302 to produce the trailing edge of the signal at the Q terminal of the latch. The output signal on the Q terminal of the latch is offset from the input signal on terminal D because of the offset of the leading edge of the signal at the C terminal of latch 1302 with respect to the signal on the D terminal.

Two frame signals are available to each TSI processor 107. One is the frame signal on line 120. The other is an offset framing signal on line 1308. The frame signal that is used is determined by the phase to which the TSI processor is assigned as indicated by the set or reset state of its latch 1301. The frame signal to be used by a TSI processor is selected by AND gates 1306 and 1307 which are controlled by latch 1301. The AND gates are enabled by the complementary signals on lines 1304 and 1305. AND gate 1306 is enabled when its TSI processor is assigned to phase 0 to pass the unaltered frame signal from frame line 120 to lead 620 for use as the local frame signal. AND gate 1307 is enabled when a TSI processor is assigned to phase 1. Enabled gate 1307 passes the offset frame signal just described from line 1308 to line 620 for use as the local frame signal. The signals enabling AND gates 1306 and 1307 work as follows.

Recall that latch 1301 produces a high at its Q terminal if its associated TSI processor 107 is assigned to phase 0. This high enables AND gate 1306 and the complementary low from the not-Q output of latch 1301 disables AND gate 1307. Conversely, the signal at the Q terminal of latch 1301 is low if its associated TSI processor 107 is assigned to phase 1. This low level disables AND gate 1306 and the complementary high from the not-Q output of latch 1301 enables AND gate 1307.

The frame signal 620 is selected by contacts 406 or 407. Only one of the gates is active. Either 1321 or 1322 has this frame pulse. It is propagated through gate 1320 to lead 620.

Thus, in summary of FIG. 13, the state of latch 1301 is determined by the phase to which its TSI processor is assigned. The state of the latch, in turn, controls AND gate 1306 and 1307 to control whether its TSI processor responds to frame signal 120 or offset frame signal 620. The state of latch 1301 also determines whether its local clock lead 1321 is high during phase 0 or during phase 1 of each time slot.

TSI PROCESSOR OPERATION-FIG. 6

Figure 6:
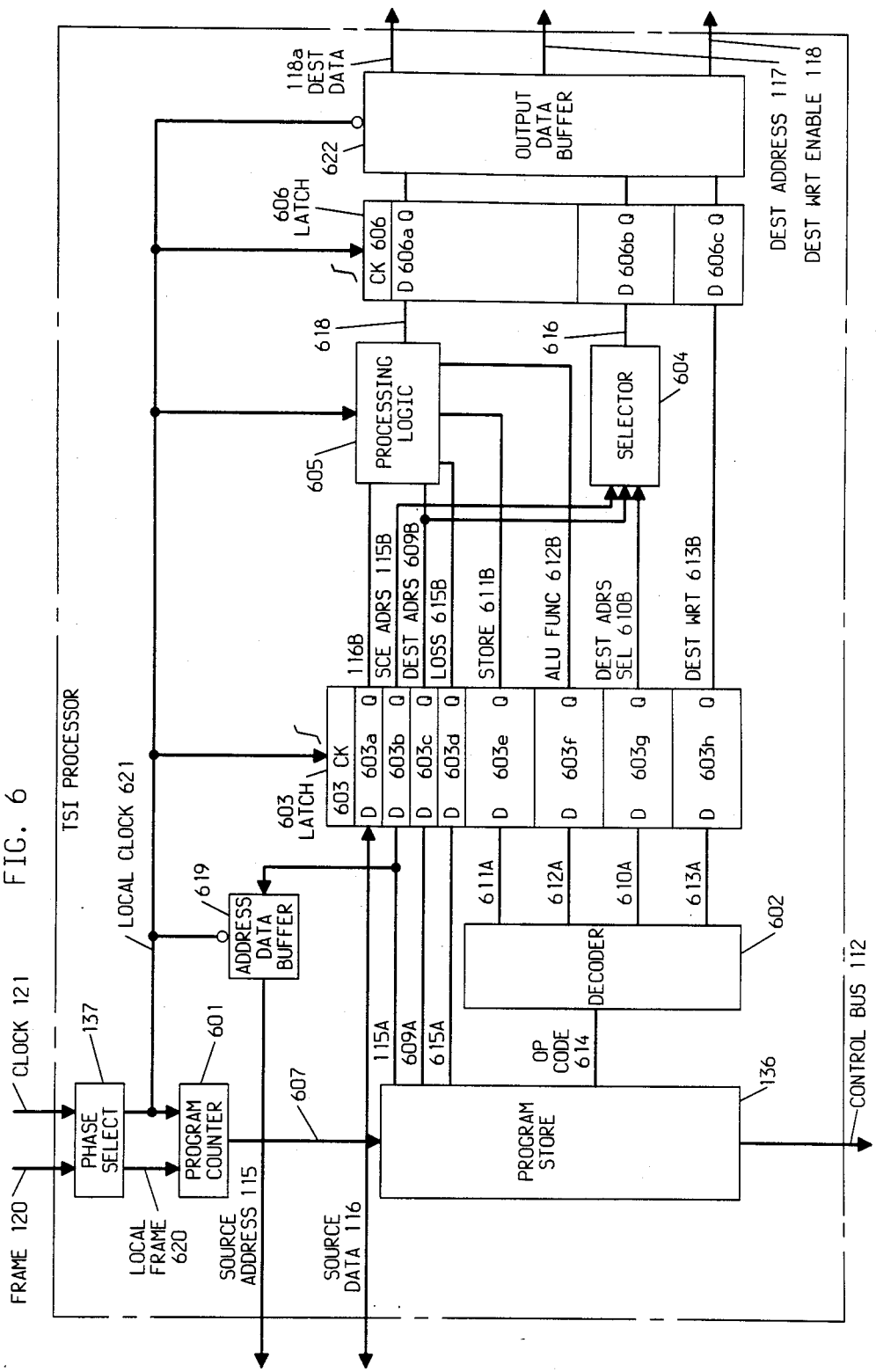
FIG. 6 illustrates a TSI processor 107.

The TSI processor 107 of FIG. 6 is controlled in its operation by instructions stored in program store 136. These instructions are written into the program store and continuously updated by common control 108 via control channel 112.

Program store 136 instructions are read out onto bus 614 under control of binary coded address information from program counter 601. Counter 601 is reset to its position 0 by each frame pulse on path 620 and is advanced one position in response to each clock pulse on path 621. Each readout instruction causes source data in an addressed location of an input data store 104 to be read out onto source data bus 116 and entered into section 603a of latch 603. From there it is subsequently applied over path 116B to processing logic 605 which performs any computations specified by the OP code portion of the instruction and then passes the resultant information to latch 606 over path 618. The information in latch 606 is extended through buffer 622 as destination data into output data store 134 of FIG. 1 over busses 118 and 117 of FIG. 6.

System clock 106 controls the timing of the TSI processor as well as the timing circuitry of the other system elements such as the port carriers 102 and data stores 104 and 134. The overall system may be assumed to operate at the conventional 8 kz sampling rate. Therefore clock 106 operates at a frequency of 4.096 MHz and applies a signal to path 121 that defines 512 TSI instructions 8000 times a second. This characterizes a frame duration of 125 microseconds. Clock 106 sends a frame pulse over line 120 once every 125 microseconds to keep to various system timers, including phase select 137, in synchronism and to indicate the beginning of each new frame.

The system of FIGS. 1 and 2 may be assumed to have 256 time slots per frame, as discussed. Program store 136 may be assumed to have 1024 addressable locations designated 0 to 511 for TSI 107-0 and 512 to 1023 for TSI 107-1 in a two phase system. The common control 108 recognizes instructions 0 through 1023, but internally each TSI processor 107 has instructions 0 through 511. Each TSI processor 107 has the capability of addressing and reading out any location of any input data store during a system time slot. The readout information is transferred through the TSI processor and written into any specified location of any output data store 134. Generally, two instructions are required in the serving of nonconference two-party calls. One instruction sends call information from station A to station B. The other instruction sends information from station B to station A. These 512 program store instructions therefore permit the serving of a maximum of 256 nonconference calls concurrently by each TSI processor 107.

Program counter 601 has 512 positions and operates under control of the system clock 106 through clock phase select 137. It is reset to its 0 position at the beginning of each frame by a frame pulse on path 620. It is advanced through its positions 0 to 511 during each frame by local clock pulses on bus 621. The counter 601 output on path 607 comprises binary coded signals that are applied as address information to program store 136 which operates in synchronism with counter 601 and advances through its positions 0 to 511.

Each program store 136 instruction interval is the frame interval of 125 microseconds divided by 512 or 244 nanoseconds. This instruction interval may be divided into a first and a second segment. In the first segment, the program store 136 reads out the store 104 location addressed by the program counter 601 and makes other contents of the readout location available to the other parts of the TSI processor 107. In the second segment, program store 136 and common control 108 communicate with one another to perform various required functions including that of writing a new instruction into the currently addressed program store location. By this means, common control 108 and program store 136 continuously communicate with one another so that program store 136 is dynamically updated with new instructions. Each instruction in store 136 specifies the function to be performed by the instruction, the store 104 location to be read, the gain to be applied to the signal readout of store 104, and the store 134 address to which the processed data is to be sent. The program store 136 instruction interval is limited to 244 nanoseconds by the processing time of the instruction and call time slot data within the TSI processor 107.

The data stores 104 and 134 transfer call data to and from the TSI 107. The data store data transfer time is limited by the RAM 401, 402, 501, and 502 read and write time. These RAMs can operate several times faster than each TSI processor 107-N. This leads to the table of options listed below:

| No. of Phases | No. of TSIs 107-7 | No. of Instructions | No. of 2 way Calls |
| --- | --- | --- | --- |
| 1 | 1 | 512 | 256 |
| 2 | 2 | 1024 | 512 |
| 4 | 4 | 2048 | 1024 |
| 8 | 8 | 4096 | 2048 |

The present blocking switch becomes nonblocking at 8 phases in the above-described system.

FIG. 7 illustrates the instruction format of program store 136. As shown, from left to right, each instruction comprises a 4 bit OP code field, a 4 bit loss field, an 11 bit destination address field and an 11 bit source address field. The destination address field includes an 8 bit accumulator number subfield.

The OP code field specifies the function to be performed by the instruction. The loss field represents the attenuation or gain that is to be applied to the received signal. The destination address field instructs the TSI to apply its output information to a specified location of a specified output data store 134. The source address field indicates the location of the input data store 104 from which the call information that is to be operated upon is to be read. The accumulator number subfield of the destination address field is used only for conference calls and, as subsequently described, specifies an accumulator memory location within processing logic 605 that is to be used in serving each conference call. The function of this element is described in further detail in connection with FIG. 11.

FIG. 8 discloses the two instructions required to serve a typical nonconference two-party call involving stations designated A and B. The OP code SD (source to destination) specifies that source information of station A is to be transmitted from the source address location of the input data store 104 to a destination address location of station B in an output data store 134. The loss field value of 0 for this call indicates that the amplitude of the received source data is not to be altered. The top instruction of FIG. 8 causes the TSI processor to read the source data in location A of the input data store 104 and to transfer it as destination data to address B of the output data store 134 with the signal amplitude of the data being unchanged. The second instruction of FIG. 8 performs a similar operation in reading the source data for address B in an input data store 104 and for transferring it to location A of the output data store 134.

Let it be assumed in connection with this description that the instruction for the currently described call is located in address 2 of program store 136. Location 2 of program store 136 is read out when it is addressed and the source address for station 100-0 is applied by program store 136 via path 115 to buffer 619. During the phase assigned to a TSI processor, a clock pulse provided by phase select element 137 on local clock line 621 causes the source address of station 100-0 to be read out of buffer 619 and applied over source address bus 115 to input data store 104-0 of FIG. 1. This address information accesses the data store 104 location associated with station 100-0 and causes the contents of the addressed location to be read out and applied to source data bus 116 extending to the input side of latch 603. This information is entered into section 603a of latch 603 at the proper time by the lagging edge of the same pulse on path 621 from the phase select element 137.

At the same time that program store 136 reads out and applies source address information to address bus 115 via buffer 619, it also reads out and applies: the destination address contained in the currently readout instruction to bus 609A, the instruction OP code to bus 614, and the gain information to bus 615A. The OP code is applied to decoder 602 which generates and applies to latch 603 information over paths 610A, 613A, 611A, and 612A. The information on path 610A represents a destination address select signal whose function is subsequently described in detail. The information on bus 611A is a store signal for processing logic 605. The information on bus 612A is an arithmetic function signal for processing logic 605. The information on path 613A is a destination write signal for latch 606 and buffer 622. The functions performed by these signals are subsequently described in detail.

The information now applied to the input of latch 603 by the program store on paths 115A, 609A, and 615A, and by the decoder 602 on paths 610A, 611A, 612A, and 613A, is entered into latch 603 upon the occurrence of the next pulse from phase select element 137 on path 621. This pulse also advances the program counter 601 to position 3 so that the instruction in position 3 of store 136 is read out while the TSI processor operates upon the data now in latch 603.

The source data for station 100-0 now in section 603a of latch 603 is applied over path 116b to processing logic element 605. The destination address in section 603c is applied over bus 609B to selector 604 as well as to processing logic 605. The source address in section 603b is applied via path 115B to selector 604. The information received by latch 603 on paths 611A, 612A, and 615A is extended over paths 611B, 612B, and 615B to processing logic 605. The signal on path 613B is extended to latch 606 as a write enable signal whose function is later described.

Selector 604 operates under control of the signal on path 610B to connect its output 616 to either its input 609B or its input 115B. This causes the address information on bus 616 to be either the destination address on bus 609B or the source address on bus 115B. For two-party calls of the type now described, the destination address is applied to bus 616. This information is the destination address readout of the program store on bus 609A and extended by latch 603 via bus 609B to the upper input of selector 604. Therefore, the signal now on path 610B causes selector 604 to connect its output 616 with its input on bus 609B. Latch 606 receives a destination write signal from latch 603 via path 613B.

The signals on paths 611B, 612B, and 615B are applied to processing logic 605 and control that element so that it performs the required operations on the source data it receives at this time on source data bus 116B. As already mentioned, the only function of processing logic 605 for this instruction is to transfer the source data it receives on source data bus 116B to its output on bus 618 which extends to the input of latch 606. This transfer is effected by element 605 with a loss value of 0. At this time, latch 606 concurrently receives source data on bus 618, the destination address on bus 616, and a write signal on path 613B.

The next clock pulse on path 121 loads the source data on bus 618 and the destination address on bus 616 into latch 606. This same clock pulse advances program store 136 to its position 4 and causes it to read out the input data store 104 location specified by the instruction in position 4. The information for the instruction in position 3 of the program store is entered into the latch 603 at the same time that the processed source data on bus 618 and the destination address on bus 616 for the instruction in store 136 location 2 is written into latch 606.

The information now in latch 606 for instruction 2 of store 136 causes the latch to apply destination data through buffer 622 and over destination data bus 118a to the output data store location 134 specified by the destination address on bus 117. This destination data is written into a specified location in store 134 by the write signal on path 118 and a destination address on bus 117. Data are output over both bus 117 and bus 118a as the buffer's circuitry is enabled by the pulse on path 621 from phase select element 137.

The pipeline processor of FIG. 6 continues to operate in this manner as successive clock pulses on path 121 are received. Program counter 601 is reset to its position 0 by the local frame signal on path 630 at the beginning of each frame. Each clock pulse on path 121 advances program counter 601 to address the next location of program store 136 and to read out the signals for the next instruction. At the same time, the information in latch 603 for the immediately preceding instruction is applied to processing logic 605 and latch 606 as the currently addressed instruction in the program store is read out. At the same time, latch 606 applies to output data store 134 the information received by it for the next earlier instruction. In this way, the circuitry of FIG. 6 concurrently performs three separate functions. The first is to read out a new location of an input data store 104, the second is to process information for the preceding instruction and the third is to apply destination data to the output data store for an earlier executed instruction.

PROCESSING LOGIC 605—FIG. 11

The present specification discloses TSI processors of various kinds for serving calls of different types. Processing logic 605 for a two station nonconference call TSI processor is shown on FIG. 11. Processing logic 605 for a conference call TSI processor is shown on FIG. 12.

Figure 11:
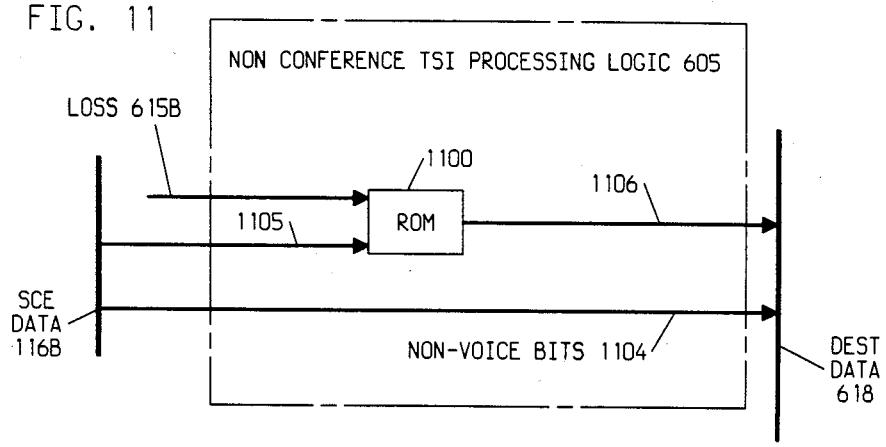
FIG. 11 illustrates the logic elements of a nonconference call TSI processor.

FIG. 11 illustrates the elements comprising the processing logic 605 on FIG. 6 for a nonconference call TSI. These elements comprise a Read Only Memory (ROM) 1100, and the paths required to serve the ROM. The circuitry of FIG. 11 receives source data on bus 116B. It performs the specified function on this source data and applies it to output busses 1106 and 618 as destination data that is to be written into an output data store 134. Any "nonvoice bits" on bus 116B that do not require processing can be extended via path 1104 to the output of element 605 on bus 618.

In serving a two-party call, the SD (Source to Destination) instructions shown in FIG. 8 are used in program store 136. For the presently described call, the instructions of FIG. 8 cause the call information from station A to be extended to station B with a loss of 0. They also cause the information from station B to be extended to station A with a loss of 0. The source data from station A and store 104 is applied by bus 116B to the input of ROM 1100. ROM 1100 also receives a signal on bus 615B specifying the loss value of 0. With an indicated loss value of 0 on bus 615B, the ROM receives source data as address information on path 1105 and reads data out of its addressed location and applies it to bus 1106 which, in turn, extends it to destination data bus 618. The information read out of the ROM corresponds to the input information since a gain of 0 is specified. The information from station B is processed in a similar manner.

PROCESSING LOGIC 605—FIG. 12

Figure 12:
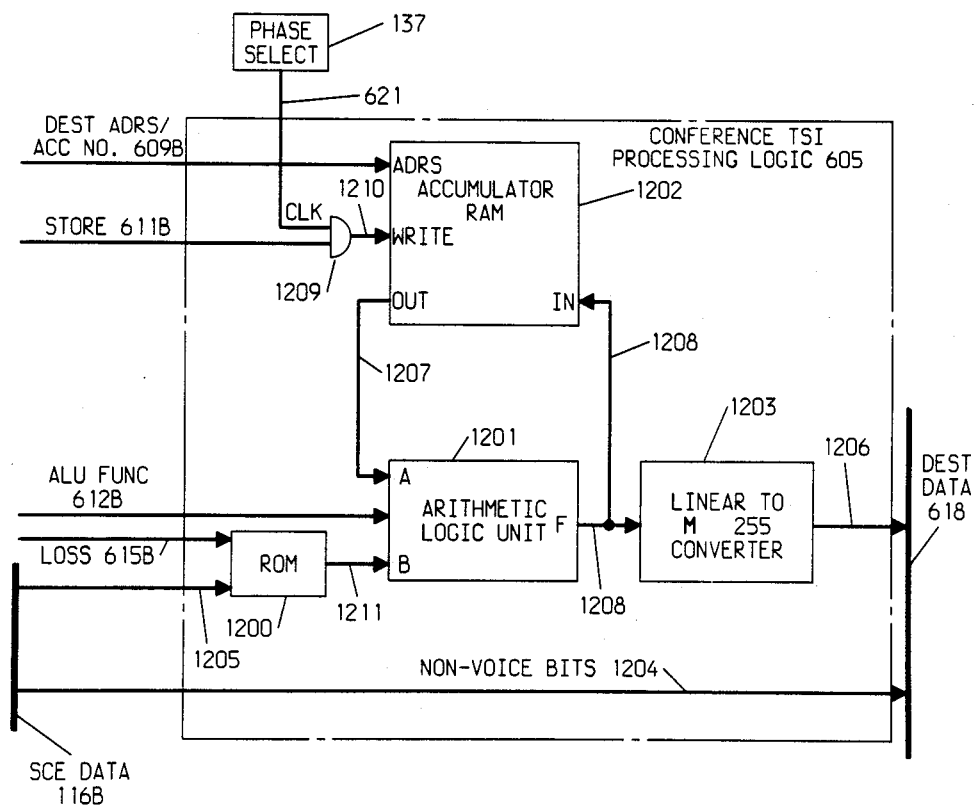
FIG. 12 illustrates the logic elements of a conference call TSI processor.

FIG. 12 illustrates the elements comprising processing logic 605 on FIG. 6 where this logic comprises a TSI processor capable of serving both conference and nonconference calls. The processing logic of FIG. 12 comprises a Read Only Memory (ROM) 1200, Arithmetic Logic Unit (ALU) 1201, accumulator (Random Access Memory) RAM 1202, and a linear to MU255 converter 1203.

The TSI processor of FIG. 12 serves two-party nonconference calls in the same manner already described for the TSI processor of FIG. 11. The SD (Source to Destination) instructions shown in FIG. 8 are used to serve a nonconference call. These instructions cause call information from station A to be extended to station B with a loss of 0. The source data from station A is applied by path 116B to the input of ROM 1200. ROM 1200 also receives a signal on path 615B specifying the loss value of 0. The ROM comprises a MU255 to linear converter and the signals on paths 1205 and 615B effectively comprise address signals for the ROM so that it can perform its conversion function with the specified insertion gain or loss. With an indicated loss value of 0 on path 615B, the ROM receives MU255 source data on path 1205 and converts it to linear data on path 1211 which extends to the B input of the ALU. The ALU is capable of performing various arithmetic and logical functions specified by control signals applied to path 612B. The signal on path 612B at this time instructs the ALU to extend the signals received on its B input to its F output. It thus performs the F=B function. The call signals on the F output are extended over path 1208 to the input of converter 1203. Converter 1203 converts this call information from linear back to a MU255 form and applies it to path 1206 which becomes path 618. From there, the call data is written into an output data store 134 under control of destination address signals on path 117 on FIGS. 1 and 2. Any "nonvoice bits" on path 617 that do not require processing can be extended via path 1204 to the output of element 605 on path 618.

The preceding paragraphs have described how the circuitry of FIGS. 6 and 12 reads source information out of station A and into an input data store 104, passes it through the TSI processor 107 including processing logic 605, and writes it as destination data in an output data store 134 under control of destination address information on path 117. The output data store is subsequently readout under control of the system clock 106 and time slot counter 135. The read out information is extended over path 119 to carrier 102 where it is demultiplexed and applied via a port circuit to station B, which is station 100-1 for the currently described call. The system functions to transmit call information from station B (100-1) on the left to station A (100-0) on the right in an analogous manner.

The following describes the functioning of the circuitry of FIGS. 6 and 12 in processing a three-party conference call involving stations A, B, and C. The program store 136 instructions for serving this call are illustrated in FIG. 10. The first instruction, SA (Source to Accumulator), takes the source data signals from station A and writes them into an assigned location (location 29 for the present example) of the accumulator RAM 1202. The second instruction, SPA (Source Plus Accumulator to Accumulator), causes the ALU 1201 to receive the source data speech signals from station B, add them to data for station A currently stored in the accumulator location 29 and to put the resultant sum back into the location 29 of the accumulator. The third instruction, SPA, causes the ALU to receive source data signals from station C and add it to the sum of the signals for stations A and B already in the accumulator. Instruction 4, MSAD (Minus Source Plus Accumulator to Destination), causes the ALU to receive the signals for station A on path 1211, subtract them from the sum A+B+C in RAM 1202 and to pass the result (B+C) to the destination output path 618. This difference signal of B+C is written into an output data store 134 and transmitted to station A. As a result of this operation, station A receives only the speech signals for stations B and C. In this manner each conferee receives only the speech signals of the other conferees.

On instruction 1 of FIG. 10, the source data signals from station A are applied to path 617 and extended through ROM 1200 and path 1211 to the B input of the ALU. The ALU extends the station A signals to its F output and over path 1208 to the input of the accumulator RAM 1202. The 8 bit accumulator number field of the destination address field of FIG. 7 is used as accumulator address information at this time and applied to RAM 1202 over path 609B. This address assigns a unique RAM location (such as 29) to the serving of this conference call. Lead 611B receives a store signal at this time which is applied to AND gate 1209. The next clock pulse on path 621 and the upper input of the AND gate generates a write signal on path 1210 and causes the RAM to write the source data from station A on path 1208 into RAM location 29 as specified by the address information for station A on path 1208 is extended through converter 1203 to path 618, it is not written into register 606 because a write signal is not applied at this time to path 613B of FIG. 6.

In instruction 2 of FIG. 10, the ALU receives the call information for station B on its B input. The signals now on path 612B instruct the ALU to perform the function F=A+B. In performing this function, the ALU receives the call signals from station B on its B input, it receives the call signals for station A stored in RAM 1202 on its A input, it adds these two signals and applies the resultant sum of A+B to the input of RAM 1202. This sum is then written into addressed location 29 of the RAM upon the coincidence of a store signal on path 611B and a clock signal on path 621. In performing this F=A+B operation, the RAM reads out the call information for station A under control of address signals on path 609B. It also writes the resultant sum of stations A and B into the same location 29 specified by the address signals on path 609B.

The ALU and the circuitry of FIG. 12 operate in a similar manner for instruction 3 of FIG. 10. Specifically, the call signals for station C are received at the B input of the ALU, the sum of the signals for stations A+B are received at the A input, the ALU adds these signals together to form the sum of A+B+C at its F output. This resultant sum is written back into the same location 29 of RAM 1202 under control of the address information on path 609B and a write signal on path 1210. On instruction 4 of FIG. 10, ALU 1201 receives the source data call signals for station A on its B input and receives the sum signals for stations A+B+C on its A input. The control on path 612B at this time instructs the ALU to subtract the signal on input B from the signal on input A and to apply the resultant signal to the F output. This causes the sum of stations B+C to appear at the output, to be extended through converter 1203, and to be written as destination data in store 134 and extended to a party A at station A who then hears only the speech signals for stations B and C in the receiver of his subset. For this instruction, store signal 611B will be inactive so RAM location 29 is not changed, while destination write signal 613B of FIG. 6 will be active so that the output data store 134 will be written.

Instructions 5 and 6 of FIG. 10 cause the ALU to perform comparable subtraction operations on the source data from stations B and C and the sum signals A+B+C in RAM 1202 so that stations B and C only receive the speech signals for the other two conferee stations.

The program store 136 instructions required to serve a call need not be contiguous to one another. The reason for this is that the provision of RAM 1202 to serve conference calls effectively provides a unique register for each currently served conference call. Thus, in serving a first conference call, one or more of the required instructions may be executed and the results stored in the assigned accumulator register. Instructions for other conference calls may then be executed and the results stored in the accumulator registers assigned to these other calls. The results stored in the accumulator register for the first call are not over written as these other calls are served. The remainder of the required instructions for the first call may be subsequently executed with assurance that the contents of the assigned accumulator register are valid and have not been over written with data from other calls. This feature represents a significant advance over Alles and results in simpler programming since the plurality of instructions required for a call need not be contiguous within the program store 136. Because of this, the common control 108 is relieved of the burden of periodically rearranging the instructions in program store 136 in order to provide sizable blocks of unused memory locations for the serving of newly arrived conference calls requiring contiguous memory locations as taught by Alles.

Thus, in review, this invention proposes a multiple TSI processor system that divides each instruction interval into two or more phases on the address and data busses between the processor and its source data stores and destination data stores. Each TSI processor is assigned by control commands to operate on only one phase of the instruction interval. The data stores are capable of responding to the aggregate sum of TSI instructions and phase intervals.

Also, the TSI processors may be built for special functions. Examples of this are the conferencing TSI and a simpler nonconferencing TSI. In a two phase system, one would be assigned by the software to handle conference calls while the other TSI would handle other traffic.

What is claimed is:

1. A time division (TD) communication switching system for controllably establishing call connections between selected ports via a time slot interchanger (TSI) wherein said TSI comprises:
    an input data store for receiving call data from the ones of said ports currently serving calls,
    an output data store for applying call data to the ones of said ports currently serving calls,
    a plurality of TSI processors,
    means effective on a call for extending call data from said input data store to a selected one of said TSI processors,
    means in said selected TSI processor for processing said extended call data by performing specified logic operations on said call data,
    means in said selected TSI processor for applying said processed data for said call to said output data store, and
    means in another one of said TSI processors for concurrently serving another call between other ones of said ports by receiving data for said other call from said input store, by processing said data, and by extending said processed data to said output store.

2. The system of claim 1 wherein said input store and said output store each comprising a plurality of stores each of which is associated with a different plurality of said ports.

3. A time division (TD) communication switching system for controllably establishing call connections between selected ports via a time slot interchanger (TSI) wherein said TSI comprises:
    input data stores for receiving call data from the ones of said ports currently serving calls,
    output data stores for applying call data to the ones of said ports currently serving calls,
    a plurality of TSI processors,
    means effective on a call for extending call data from the input data store serving a first port involved on said call to a selected one of said TSI processors,
    means in said selected TSI processor for processing said extended call data by performing specified logic operations on said call data,
    means in said selected TSI processor for applying said processed data for said call to an output data store serving a second port involved on said call, and
    means in another one of said TSI processors for concurrently serving another call between two other ones of said ports by receiving data extended for said other call from said input store serving a first port involved on said other call, by processing said data, and by applying said processed data to an output store serving a second port involved on said other call.

4. The system of claim 3 wherein said input and output stores each comprise a memory having an addressable location individual to each of said ports,
    said means for extending comprising;

means for applying address signals over a first common path from said processors to said input store in distinct time periods, and means for applying call data read out of said stores over a second common path to said processors in separate time periods.

5. The system of claim 4 wherein said means for applying data to said output stores comprises:

means for applying address signals over a third common path from said processors to said output stores in distinct time periods, and means for applying call data from said processors in separate time periods over a fourth common path to said output stores for entry into the memory location specified by said address signals on said third path.

6. The system of claim 5 wherein said plurality of TSI processors time share access to said input and output stores to receive data from said input stores and to apply data to said output stores in distinct time periods.

7. The system of claim 6 in combination with:

means for applying control information to each TSI processor specifying the logic operation to be performed on the received data for each call, and means in each processor responsive to the receipt of said control information for performing said specified logic operation.

8. The system of claim 7 wherein said TSI processors are of different types for serving different types of calls, said system further comprising:

means for identifying the type of call served by each calling port, and means for assigning each call to a TSI processor of the type equipped to serve said call.

9. A time division (TD) communication switching system for controllably establishing call connections between selected ports via a time slot interchanger (TSI) wherein said TSI comprises:

an input data store for receiving call data from the ones of said ports currently serving calls, an output data store for applying call data to the ones of said ports currently serving calls, a plurality of TSI processors each equipped to serve different types of calls, means responsive to the initiation of each call for determining the call type, means responsive to said determination for assigning each call to a TSI processor of the type equipped to serve said call, means effective on a call for extending data for said call from said input data store to said assigned TSI processor, means in said assigned TSI processor for processing said extended call data by performing specified logic operations on said call data, and means in said assigned TSI processor for applying said processed data for said call to said output data store.

10. The system of claim 9 wherein said input store and said output store each comprising a plurality of stores each of which is associated with a different plurality of said ports.

11. The system of claim 9 wherein said plurality of TSI processors time share access to said input and output stores to receive data from said input store and to apply data to said output store in distinct time periods.

12. The system of claim 11 in combination with:

means for applying control information to each TSI processor specifying the logic operation to be performed on the received data for each call, and means in each processor responsive to the receipt of said control information for performing said specified logic operation.

13. In a time division (TD) communication switching system for controllably establishing call connections between selected ports via a time slot interchanger (TSI), means for defining a cyclically reoccurring series of time slots, means for assigning each call served by said system to a time slot in said series, said TSI comprising:

means for defining a cyclically reoccurring series of TSI introduction intervals each having a plurality of phases, input data stores for receiving call data from the ones of said ports currently serving calls, output data stores for applying call data to the ones of said ports currently serving calls, a plurality of TSI processors, means for assigning each TSI processor to a unique phase of each instruction interval, means effective on a first call for extending data pertaining to said call from one of said input data stores to a first selected one of said TSI processors during a first phase of an instruction interval assigned to said selected processor, means effective on a second call for extending data pertaining to said second call from said input stores to another TSI processor during a second phase of the same instruction interval assigned to said first selected TSI processor, means in said TSI processors for concurrently processing said extended call data by performing specified logic operations on said data, and means in each TSI processor for applying said processed call data for each call served by said processor to an output data store during first and second phases of an instruction interval.

14. The system of claim 13 wherein said input stores and said output stores each comprises a single store.

15. The system of claim 13 wherein said input and output stores each comprise a memory having an addressable location individual to each of said ports, said means for extending comprising;

means for applying address signals over a first common path from said processors to said input store in distinct time periods, and means for applying call data read out of said stores over a second common path to said processor in separate time periods.

16. The system of claim 15 wherein said plurality of TSI processors time share access to said input and output stores to receive data from said input stores and to apply data to said output stores in distinct time periods.

17. The system of claim 13 in combination with:

means for applying control information to each TSI processor specifying the logic operation to be performed on the received data for each call, and means in each processor responsive to the receipt of said control information for performing said specified logic operation.

18. The system of claim 13 wherein said TSI processors are of different types for serving different types of calls, said system further comprising:

means for identifying the type of call served by each calling port, and means for assigning each call to a TSI processor of the type equipped to serve said call.

19. In a time division (TD) communication switching system for controllably establishing call connections between ports via a time slot interchanger (TSI), means for defining a series of cyclically reoccurring time slots, means for assigning each call served by said system to a time slot, means for defining a series of cyclically reoccurring instruction intervals each having a plurality of phases, a TSI comprising input data stores for receiving call data from call serving ports, output data stores for applying call data to call serving ports, and transfer means for extending call data from said input data stores to said output data stores, said transfer means comprising;

a plurality of TSI processors, means for assigning each processor to a unique one of said phases in each interval, means for selecting the processor to be used on each transfer of data for a call from an input store to an output store, means for applying data for a first call to a first one of said TSI processors during a first phase of an interval, means for applying call data for a second call to another one of said TSI processor during a second phase of said interval, means in said first and second TSI processor for concurrently processing said received data, and means in each processor for transferring said data from said input store to said output store during separate phases of one of said intervals.

20. The time slot interchanger (TSI) of claim 19 wherein each processor includes;

means for specifying the logic operations to be performed on each data transfer, means for processing said data to effect said specified logic operations, and means for applying said processed data to said output store.

21. The system of claim 20 wherein each of said TSI processors are equipped to serve different types of calls, said system further comprising:

means for identifying the type of call initiated by each calling port, and means for assigning each call to a TSI processor equipped to serve said call.

22. The system of claim 21 wherein said input and output stores each comprise a memory having an addressable location individual to each of said ports, said means for extending comprising;

means for applying address signals over a first common path from said processors to said input store in distinct time periods, and means for applying call data read out of said stores over a second common path to said processors in separate time periods.

23. A time slot interchanger (TSI) comprising:

input data stores, output data stores, means for defining a cyclically reoccurring series of time slots, means for defining a cyclically reoccurring series of instruction intervals, transfer means for extending data information from said input data stores to said output data stores, said transfer means comprising;

a plurality of TSI processors, means for assigning each TSI processor to a unique phase of each interval, means effective for selecting the processor to be used on each transfer of data between said input and output stores, means for transferring data from said input store to different ones of said processors during a single interval by effecting each transfer to a processor during the phase unique to each processor, means in each processor for processing said data concurrently with said other processors, and means for applying said processed data from said processor to said output stores in separate phases of one of said intervals.

24. A method of operating a time division (TD) communication switching system for controllably establishing call connections between selected ports via a time slot interchanger (TSI) having an input data store for receiving call data from the ones of said ports currently serving calls, an output data store for applying call data to the ones of said ports currently serving calls, and a plurality of TSI processors, said method comprising the steps of:

(1) extending data for a call from said input data store to a selected one of said TSI processors, (2) operating said selected TSI processor to processes said extended call data by performing specified logic operations on said call data, (3) applying said processed data for said call to said output data store, and (4) operating another one of said TSI processors for concurrently serving another call between two other ones of said ports by receiving data for said other call from said input store, by processing said data, and by extending said processed data to said output store.

25. The method of claim 24 wherein said plurality of TSI processors are operated to time share access to said input and output stores for receiving data from said input store and for applying data to said output store in distinct time periods.

26. The method of claim 24 in combination with the steps of:

(1) applying control information to each TSI processor specifying the logic operation to be performed on the received data for each call, and (2) operating each processor in response to the receipt of said control information to perform said specified logic operation.

27. The method of claim 24 wherein said TSI processors are of different types for serving different types of calls, said method further comprising the steps of:

(1) identifying the type of call served by each calling port, and (2) assigning each call to a TSI processor of the type equipped to serve said call.

28. A method of operating a time division (TD) communication switching system for controllably establishing call connections between selected ports via a time slot interchanger (TSI) having an input data store for receiving call data from the ones of said ports currently serving calls, an output data store for applying call data to the ones of said ports currently serving calls, and a plurality of TSI processors each equipped to serve different types of calls, said method comprising the steps of:
(1) determining the call type for each initiated call,
(2) assigning each call to a TSI processor of the type equipped to serve said call,
(3) extending call data from said input data store to said assigned TSI processor,
(4) operating said assigned TSI processor to process said extended call data by performing specified logic operations on said call data, and
(5) applying said processed data from said assigned TSI processor to said output data store.

29. The method of claim 28 wherein said plurality of TSI processors are operated to time share access to said input and output stores for receiving data from said input store and for applying data to said output store in distinct time periods.

30. The method of claim 28 in combination with the steps of:
(1) applying control information to each TSI processor specifying the logic operation to be performed on the received data for each call, and
(2) operating each processor in response to the receipt of said control information for performing said specified logic operation.

31. A method of operating a time division (TD) communication switching system having a plurality of time slot interchangers (TSIs) for controllably establishing call connections between selected ports via a TSI, said method comprising the steps of:
(1) defining a cyclically reoccurring series of time slots,
(2) assigning each call served by said system to a time slot in said series,
(3) defining a cyclically reoccurring series of instruction intervals each having a plurality of phases,
(4) applying call data to input data stores from the ones of said ports currently serving calls,
(5) applying call data from output data stores to the ones of said ports currently serving calls,
(6) assigning each TSI processor to a unique phase of each instruction interval,
(7) serving a first call by extending data pertaining to said call from one of said input data stores to a first selected one of said TSI processors during a phase of an instruction interval assigned to said selected processor,
(8) serving a second call by extending data pertaining to said second call from one of said input stores to another TSI processor during another phase of the same instruction interval assigned to said other TSI processor,
(9) operating said TSI processors to concurrently process said extended call data by performing specified logic operations on said data, and
(10) operating each TSI processor to apply said processed call data for each call served by said processor to an output data store during the instruction interval phase assigned to each processor.

32. The method of claim 31 in combination with the steps of:
(1) applying control information to each TSI processor specifying the logic operation to be performed on the received data for each call, and
(2) operating each processor in response to the receipt of said control information to perform said specified logic operation.

33. The method of claim 32 wherein said TSI processors are of different types for serving different types of calls, said method further comprising the steps of:
(1) identifying the type of call served by each calling port, and
(2) assigning each call to a TSI processor of the type equipped to serve said call.

34. A method of operating a time division (TD) communication switching system for controllably establishing call connections between ports via a time slot interchanger (TSI) having a plurality of TSI processors, input data stores for receiving call data from call serving ports, output data stores for applying call data to call serving ports, and transfer means for extending call data from said input data stores to said output data stores, said method comprising the steps of:
(1) defining a series of cyclically reoccurring time slots,
(2) assigning each call served by said system to a time slot,
(3) defining a series of cyclically reoccurring instruction intervals each having a plurality of phases,
(4) assigning each processor to a unique one of said phases in each interval,
(5) selecting the processor to be used on each transfer of data for a call from an input store to an output store,
(6) applying data for a first call to a first one of said TSI processors during a first phase of an interval,
(7) applying call data for a second call to another one of said TSI processor during a second phase of said interval,
(8) operating said first and second TSI processors for concurrently processing said received data, and
(9) operating each processor to transfer said data from said input store to said output store during separate phases of one of said intervals.

35. The method of claim 34 in combination with the steps of:
(1) specifying the logic operations to be performed on each data transfer,
(2) processing said data to effect said specified logic operations, and
(3) applying said processed data to said output store.

36. The method of claim 35 wherein each of said TSI processors are equipped to serve different types of calls, said method further comprising the steps of:
(1) identifying the type of call initiated by each calling port, and
(2) assigning each call to a TSI processor equipped to serve said call.

* * * * *